(12) United States Patent
Tovo

(10) Patent No.: US 8,402,001 B1
(45) Date of Patent: Mar. 19, 2013

(54) SYSTEM AND METHOD FOR ARCHIVING DATA

(75) Inventor: Patricia A. Tovo, St. Paul, MN (US)

(73) Assignee: Symantec Operating Corporation, Mountain View, CA (US)

( * ) Notice: Subject to any disclaimer, the term of this patent is extended or adjusted under 35 U.S.C. 154(b) by 1577 days.

(21) Appl. No.: 10/266,449

(22) Filed: Oct. 8, 2002

(51) Int. Cl.
*G06F 17/00* (2006.01)

(52) U.S. Cl. ........ 707/682; 707/769; 715/236; 715/239; 711/162

(58) Field of Classification Search .............. 707/202, 707/204, 100, 10, 101, 200–201, 682, 769, 707/644, 668, 674, 728; 715/513, 517, 234, 715/236, 239; 711/162
See application file for complete search history.

(56) References Cited

U.S. PATENT DOCUMENTS

| | | | |
|---|---|---|---|
| 6,266,784 B1 * | 7/2001 | Hsiao et al. ................. 714/6 |
| 6,487,558 B1 * | 11/2002 | Hitchcock ................... 707/200 |
| 6,505,216 B1 * | 1/2003 | Schutzman et al. ......... 707/204 |
| 6,626,957 B1 * | 9/2003 | Lippert et al. .............. 715/513 |
| 6,684,222 B1 * | 1/2004 | Cornelius et al. ......... 707/104.1 |
| 6,714,952 B2 * | 3/2004 | Dunham et al. ............. 707/204 |
| 6,721,766 B1 * | 4/2004 | Gill et al. .................... 707/204 |
| 6,728,711 B2 * | 4/2004 | Richard ....................... 707/204 |
| 6,799,258 B1 * | 9/2004 | Linde .......................... 711/162 |
| 6,826,553 B1 * | 11/2004 | DaCosta et al. .............. 707/1 |
| 6,928,444 B2 * | 8/2005 | Richard ....................... 707/204 |
| 6,978,282 B1 * | 12/2005 | Dings et al. ................. 707/674 |
| 6,985,719 B2 * | 1/2006 | Leppinen et al. ............ 455/514 |
| 7,076,685 B2 * | 7/2006 | Pillai et al. ................... 714/6 |
| 7,096,250 B2 * | 8/2006 | Mutalik et al. .............. 709/202 |
| 7,103,619 B1 * | 9/2006 | Rajpurkar et al. ............ 707/204 |
| 7,103,872 B2 * | 9/2006 | Hembry ...................... 717/104 |
| 7,168,040 B2 * | 1/2007 | Yamamoto et al. .......... 715/536 |
| 7,213,066 B2 * | 5/2007 | Piersol ........................ 709/223 |
| 7,251,642 B1 * | 7/2007 | Szeto ............................ 707/1 |
| 8,010,756 B1 * | 8/2011 | Linde ........................... 711/162 |
| 2001/0027460 A1 * | 10/2001 | Yamamoto et al. .......... 707/536 |
| 2001/0044811 A1 * | 11/2001 | Ballantyne et al. .......... 707/513 |
| 2001/0051952 A1 * | 12/2001 | Nakazato ................... 707/104.1 |
| 2001/0056425 A1 * | 12/2001 | Richard ........................ 707/10 |
| 2002/0019830 A1 * | 2/2002 | Hamberg et al. ............ 707/204 |
| 2002/0046215 A1 * | 4/2002 | Petrocelli .................... 707/200 |
| 2002/0049749 A1 * | 4/2002 | Helgeson et al. .............. 707/3 |
| 2002/0069192 A1 * | 6/2002 | Aegerter ....................... 707/1 |
| 2002/0073236 A1 * | 6/2002 | Helgeson et al. ............ 709/246 |
| 2002/0083085 A1 * | 6/2002 | Davis et al. ................. 707/204 |

(Continued)

OTHER PUBLICATIONS

Charles R. Mc Clain, Gary Fu, Michael Darzi and James K. Firestone—"PC-SEAPAK User's Guide—Version 4.0"—NASA Technical Memorandum 104557-595D—Jan. 1992 (PDF Version edited by R. A. Farr, Sep. 1996)—National Aeronautics and Space Administration Goddard Space Flight Center Greenbelt, MD 20771 USA—(pp. 1-139).*

(Continued)

*Primary Examiner* — Anh Ly
(74) *Attorney, Agent, or Firm* — Campbell Stephenson LLP

(57) ABSTRACT

Systems, methods, apparatus and software can utilize a markup language to import and export data that is archived using a backup and restore system. An export utility extracts data produced or processed by an application program, converts it into a markup language format, and provides it to a backup and restore system. An import utility extracts data in a markup language format, converts it to another format, and provides the data for use by the application program. In one example, the application program is a database management system.

8 Claims, 5 Drawing Sheets

U.S. PATENT DOCUMENTS

| | | | | |
|---|---|---|---|---|
| 2002/0091710 | A1* | 7/2002 | Dunham et al. | 707/200 |
| 2002/0116210 | A1* | 8/2002 | Medina et al. | 705/1 |
| 2002/0143785 | A1* | 10/2002 | Pugh | 707/102 |
| 2002/0147745 | A1* | 10/2002 | Houben et al. | 707/513 |
| 2002/0156921 | A1* | 10/2002 | Dutta et al. | 709/246 |
| 2002/0178173 | A1* | 11/2002 | Chefalas et al. | 707/200 |
| 2002/0198908 | A1* | 12/2002 | Hartel | 707/513 |
| 2003/0005120 | A1* | 1/2003 | Mutalik et al. | 709/225 |
| 2003/0018657 | A1* | 1/2003 | Monday | 707/204 |
| 2003/0018668 | A1* | 1/2003 | Britton et al. | 707/513 |
| 2003/0037069 | A1* | 2/2003 | Davison | 707/200 |
| 2003/0046313 | A1* | 3/2003 | Leung et al. | 707/204 |
| 2003/0105746 | A1* | 6/2003 | Stickler | 707/3 |
| 2003/0110315 | A1* | 6/2003 | Upton | 709/328 |
| 2003/0110447 | A1* | 6/2003 | Froyd et al. | 715/513 |
| 2003/0120686 | A1* | 6/2003 | Kim et al. | 707/200 |
| 2003/0172158 | A1* | 9/2003 | Pillai et al. | 709/225 |
| 2003/0182450 | A1* | 9/2003 | Ong et al. | 709/246 |
| 2004/0002950 | A1* | 1/2004 | Brennan et al. | 707/1 |
| 2004/0010521 | A1* | 1/2004 | Li et al. | 707/200 |
| 2004/0044707 | A1* | 3/2004 | Richard | 707/204 |
| 2004/0054697 | A1* | 3/2004 | Tsaur et al. | 707/204 |
| 2004/0117773 | A1* | 6/2004 | Nicolle | 717/136 |
| 2004/0148288 | A1* | 7/2004 | Haeberle et al. | 707/10 |
| 2004/0205576 | A1* | 10/2004 | Chikirivao et al. | 715/513 |
| 2004/0215665 | A1* | 10/2004 | Edgar et al. | 707/200 |
| 2004/0236803 | A1* | 11/2004 | Spiegeleer | 707/204 |
| 2004/0255048 | A1* | 12/2004 | Lev Ran et al. | 709/249 |
| 2004/0268243 | A1* | 12/2004 | Yamamoto et al. | 715/513 |
| 2005/0015720 | A1* | 1/2005 | Yamamoto et al. | 715/513 |
| 2005/0044110 | A1* | 2/2005 | Herzenberg et al. | 707/104.1 |
| 2005/0065951 | A1* | 3/2005 | Liston et al. | 707/101 |
| 2005/0091247 | A1* | 4/2005 | Berkowitz et al. | 707/100 |
| 2005/0160118 | A1* | 7/2005 | Berkowitz et al. | 707/204 |
| 2005/0160119 | A1* | 7/2005 | Yoneda | 707/204 |
| 2006/0004887 | A1* | 1/2006 | Schenk | 707/204 |
| 2006/0010174 | A1* | 1/2006 | Nguyen et al. | 707/202 |
| 2006/0200698 | A1* | 9/2006 | Pillai et al. | 714/6 |
| 2007/0067263 | A1* | 3/2007 | Husain et al. | 707/2 |

OTHER PUBLICATIONS

Canova et al.—"Simulation to Support Operational Testing: A Practical Application"—Proceedings of the 1999 Winter Simulation Conference—P. A. Farrington, H. B. Nembhard, D. T. Sturrock, and G. W. Evans, eds.—The MITRE Corporation 234 South Fraley Boulevard Dumfries, VA 22026, U.S.A.—(pp. 1071-1078)—Dec. 1999 WSC '99.*

Shelly Shiggins (Primary Author), Oracle*8i* Application Developer's Guide—XML, Release 3 (8.1.7), Part No. A86030-01, Sep. 2000, Oracle Corporation, pp. 4-1 through 4-64.

Space Program, *Space Program Prometheus and Pandora*, wwwspaceprogram.com/products._prompand.html, Copyright © 2001 Space Program Corp.

* cited by examiner

SYSTEM AND METHOD FOR ARCHIVING DATA

FIELD OF THE INVENTION

The present invention relates to the field of data protection and more particularly to a system and method for saving and restoring data using markup languages.

BACKGROUND OF THE INVENTION

The ever increasing reliance on information and the computing systems that produce, process, distribute, and maintain such information in its myriad forms continues to put great demands on techniques for data protection. Simple systems providing periodic backups of a computer system's data have given way to more complex and sophisticated data protection schemes that take into consideration a variety of factors including: the wide variety of computing devices and platforms encountered, numerous different types of data that must be protected, the speed with which data protection operations must be executed, and the flexibility demanded by today's users.

FIG. 1 illustrates an example of a data backup and recovery system for use in a variety of computing environments, e.g., small business, enterprise, educational, and government computing environments. Computing system 100 includes a number of computer systems (server 120, workstations 130 and 140, backup and restore master server 150, and media server 170) interconnected by network 110. Network 110 can implement any of a wide variety of well known computer networking schemes but is typically a local area network (LAN), e.g., an enterprise-wide intranet, or a wide area network (WAN) such as the Internet. Each of server 120, workstation 130, and workstation 140 include information such as system software, application software, application data, etc., that has some value to users of the computer systems and thus requires some level of data protection.

Information protection within computing system 100 is controlled and coordinated by software operating on backup and restore master server 150. The software operating on the backup and restore master server is the "brains" for all data protection activities and provides, for example, scheduling and tracking of client computer system backups and restorations, management of data storage media, and convenient centralized management of all backup and restoration activities. In the example illustrated in FIG. 1, backup and restore master server 150 can also have one or more storage devices, e.g., tape drive 160, attached directly to the server or through network 110 for backing up and restoring data from multiple clients. In support of such a data protection system, each of the clients, e.g., server 120, workstation 130, and workstation 140, of backup and restore master server 150 typically includes backup and restore client software or agents. Such agents typically receive instructions from backup and restore master server 150 and handle the extraction and placement of data for the particular client computer system. Together, backup and restore master server 150 and the backup and restore agent operating on a client computer system can backup and restore files, directories, raw partitions, and databases on client systems. Such data protection software can also be used to archive and restore logical database data.

FIG. 1 also illustrates another possible component of computing system 100. Media server 170 can be used in conjunction with data intensive applications, such as data warehouses, to locally back up large applications while backing up other client systems over the network. Media server 170 can share a storage device such as storage array 180 (e.g., a tape library) with backup and restore master server 150 or another media server (not shown).

While the system described in FIG. 1 performs data protection duties well, protecting and archiving large amounts of data from specific applications, e.g. database management systems, can pose additional challenges. Typical database backup and database extraction operations include physical backups, logical exports, and ASCII file dumps. These operations are not particularly suited for long-term archiving because they either use proprietary file formats or are not self-describing. Online and offline physical database backups are generated using proprietary tools associated with the database management system. For example, physical database backups of databases created by Oracle Corporation's database management systems can utilize Oracle's Recovery Manager (RMAN) tool to provide quick restore and point-in-time recovery to protect from media failures. However, such techniques use the proprietary vendor file format and must be recovered using the database management system after the data has been restored. Logical exports of relational data using database vendor proprietary tools supplement physical database backups and provide protection from user failure by allowing for the restoration of individual tables. However, logical exports also produce proprietary formats that can only be read by vendor tools. ASCII dump files, e.g., comma-delimited tabular data, are in a non-proprietary format but are not self-describing using a standard method. Vendor tools are available to load data from an ASCII dump file by creating a control file that instructs the specific tool how to load the data, but the format of the control file is not standard across vendor tools.

In addition, the time to produce each type of backup or logical extraction varies considerably with the method. Although one of the most efficient methods for backup and restore is physical database backup followed by proprietary export and corresponding import, such techniques suffer the above mentioned deficiencies. The time to produce an ASCII dump file (and any associated control information) is generally longer than physical backups.

Finally, the amount of space required for each type of backup or logical extraction also varies with the method. The relative size of the backup or logical extraction depends on the percentage of unused blocks in the database, and, in the case of a proprietary export, how much meta-data, is included and whether or not indexes are included.

Accordingly, it is desirable to provide systems and methods for data protection that provide the added flexibility and archival advantages lacking in current systems.

SUMMARY OF THE INVENTION

It has been discovered that systems, methods, apparatus and software can utilize a markup language to import and export data that is archived using a backup and restore system. An export utility extracts data produced or processed by an application program, converts it into a markup language format, and provides it to a backup and restore system. An import utility extracts data in a markup language format, converts it to another format, and provides the data for use by the application program. In one example, the application program is a database management system.

Accordingly, in one aspect of the present invention, a system includes a backup and restore module and a markup language module. The backup and restore module is configured to at least one of: generate a first data stream to be backed up and transmit the first data stream to a backup and restore server for further direction to a storage device; and receive a second data stream from a backup and restore server. The markup language module is configured to at least one of: translate data from an application into a markup language version of the data from the application and pass the markup language version of the data from the application to the backup; and receive markup language data from the backup and restore module and translate the markup language data from the backup and restore module into data for the application.

Another aspect of the present invention provides a method. A request to archive data associated with an application program is received. The data associated with the application program is extracted from at least one data file. The data associated with the application program is translated into a markup language version of the data associated with the application program. The markup language version of the data associated with the application program is transmitted to at least one of a backup and restore module and an archive file.

Still another aspect of the present invention provides another method. A request to import markup language data associated with an application program is received. The markup language data associated with the application program is received from at least one of a file and a backup and restore module. The markup language data associated with the application program is translated into an application program readable version of the markup language data. The application program readable version of the markup language data is loaded into an application program data file.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
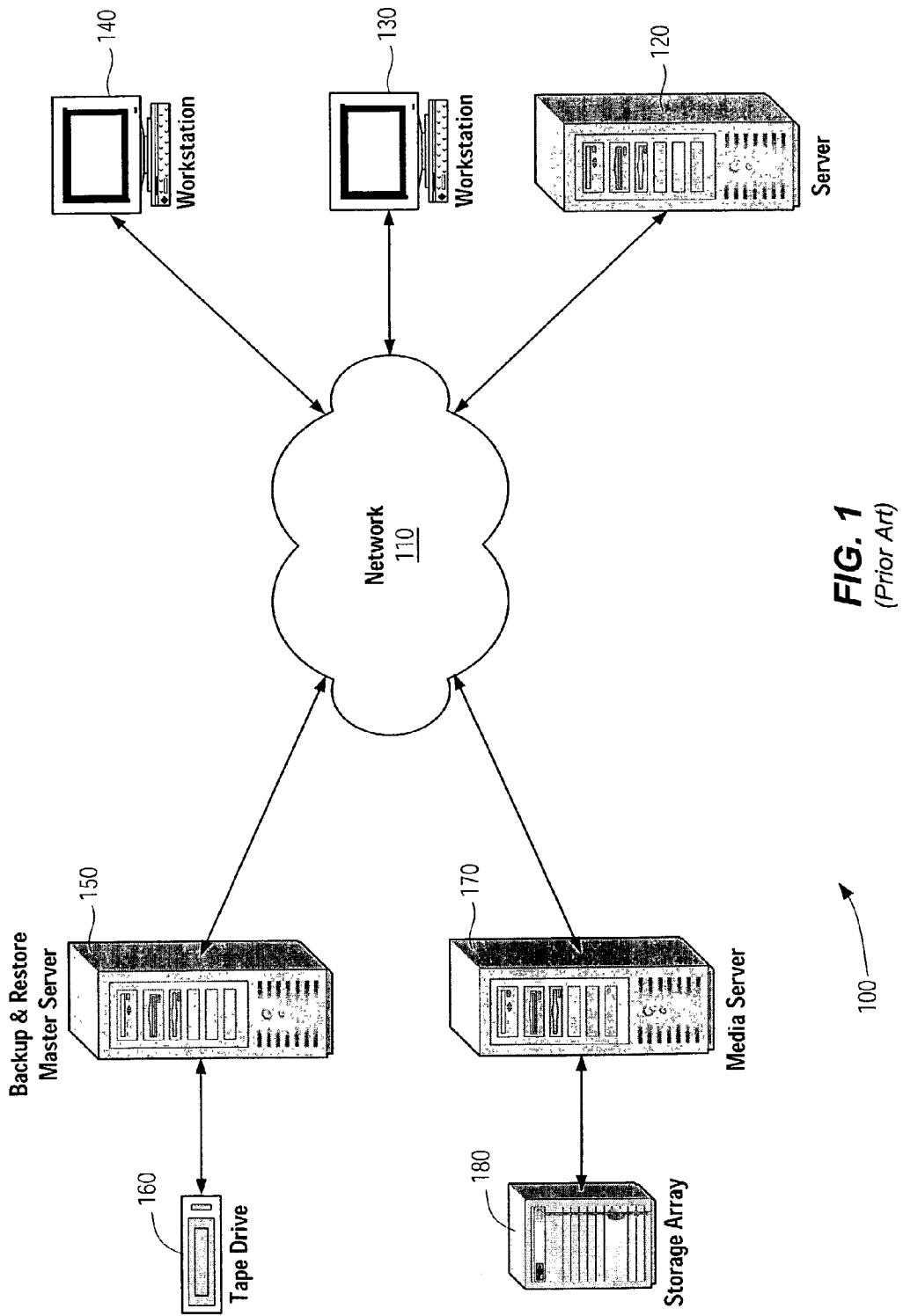
FIG. 1 is a simplified block diagram of a data backup and recovery system for use in a variety of computing environments.

Integrating markup language support in the distributed data backup and restoration system of FIG. 1 provides added flexibility and a variety of additional features. In general, a markup language can be thought of as a set of codes designed to accompany data (typically in the form of a text file) and to instruct a computer system how to format, present, index, and/or link the accompanying data. Markup languages can include so called "metalanguages"—a language for describing other languages—which allow the design of customized markup languages for supporting a variety of different types of documents. While the systems and techniques described below will focus on the use of a particular markup language, the eXtensible Markup Language (XML), it should be understood that a variety of different markup languages can be used to implement the systems and methods described in this application.

The eXtensible Markup Language (XML) is quickly becoming a standard way to identify and describe data from many different types of sources and deliver it in standard format across an enterprise and between businesses in e-commerce applications. The XML specification is developed and maintained by the World Wide Web Consortium (W3C). Like the HyperText Markup Language (HTML), XML is a subset of the Structured Generalized Markup Language (SGML) as specified by the International Organization for Standardization (ISO 8879:1986). Unlike HTML, which tags elements in web pages for presentation by a browser, XML tags elements as data. Tags can be defined by using them in an XML document or they may be formally defined in a Document Type Definition (DTD) or schema. The XML format is a computer system, application, and database independent format. It is self-identifying in that it contains the keys to understanding the format of the data as well as the data itself. XML is also highly granular in that it can be used to describe any subset of data in a database.

Because XML includes data (i.e., metadata) describing the underlying data it is used with, XML can be used to satisfy requirements for long-term data archiving. Because XML is not the proprietary technology of one software vendor, it provides added flexibility to migrate data and to gain access to data long after proprietary tools (and the companies that provide them) are no longer available.

Figure 2:
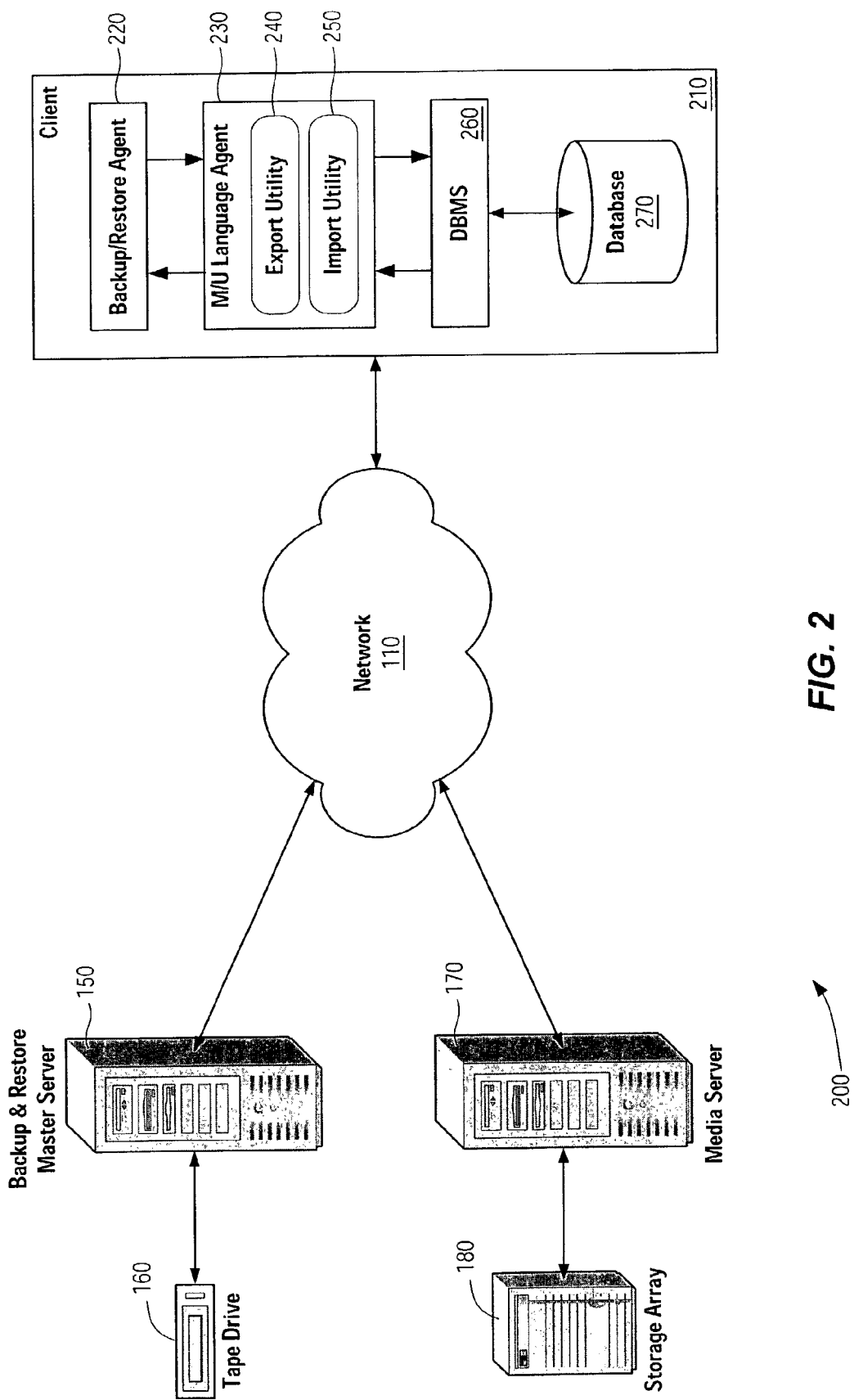
FIG. 2 illustrates a data backup and recovery system where a client computer system includes a markup language agent.

FIG. 2 illustrates a data backup and recovery system 200 where a client computer system includes a markup language agent 230. In this example, client computer system 210 executes a number of different pieces of software. Backup and restore agent 220 communicates with software operating on backup and restore master server 150 (and potentially with software on media server 170) to coordinate the backing up and restoration of data on client computer system 210. For example, backup and restore agent 220 is responsible for generating the data stream to be backed up and software on backup and restore master server 150 and/or media server 170 directs this data stream to a secondary storage device such as tape drive 160.

In general, backup and restore agent 220 provides an interface between applications or facilities needing data storage management for backup or archive purposes, and the underlying services which provide these functions. An application programming interface (API) is provided that supports both data movement and data management. The functions provided include support for both the backup/restoration and the archive/retrieval of tailored sets of data objects including files, directories, and byte streams for many different applications and users operating concurrently. Facilities to support archive and backup object searches and the ability to handle a large volume of large data objects, a wide spectrum of systems and system configurations, and a high level of integrity including guaranteeing consistency and atomicity of multiple operations is provided.

Backup and restore agent 220 also interfaces with markup language agent 230 which performs much of the markup language related data processing for computing system 200. Markup language agent 230 can interface with a variety of different application programs operating on client computer system 210. Markup language agent 230 includes two utilities, export utility 240 and import utility 250, to perform data conversion of data exported to and imported from an application. As shown, markup language agent 230 interfaces with a database management system (DBMS) 260. In turn, database management system 260 produces, processes, modifies and/or manipulates the data stored in database 270.

As illustrated in FIG. 2, backup and restore agent 220 and markup language agent 230 are shown as separate software modules. These modules, and indeed any of the software modules described herein, can be combined into single software modules, implemented on separate computer systems, executed as separate threads on a single computer system, etc. Additionally, the other components of backup and restore system 200, e.g., backup and restore master server 150 and media server 170 are merely exemplary and can be implemented in a variety of different ways as is well known in the art. For example, the software implementing backup and restore master server 150 functionality and the software implementing media server 170 functionality can be combined so that both functions are performed on a single server. Other examples of software operating on backup and restore master server 150 and media server 170, as well as software such as backup and restore agent 220 can be found in the VERITAS NetBackup™ family of products provided by VERITAS Software Corporation.

The markup language export feature can be used for long-term archival when the likelihood of needing the data in the short-term is low, and provides the option to bring back the data at some future time when the current set of operating systems, DBMSs, applications, etc. may not be available. In the case of an XML implementation, imported or exported data includes both the desired data itself and metadata describing the organization of the data. The metadata that is included in an XML document generated by export utility 240 typically includes table names, column names, and column data types. Data value constraints, e.g., a "not null" column constraint, can also be included. Other types of metadata can optionally be included, such as, other types of constraints, indexes, and storage parameters, e.g., extent size and default tablespace.

Figure 3:
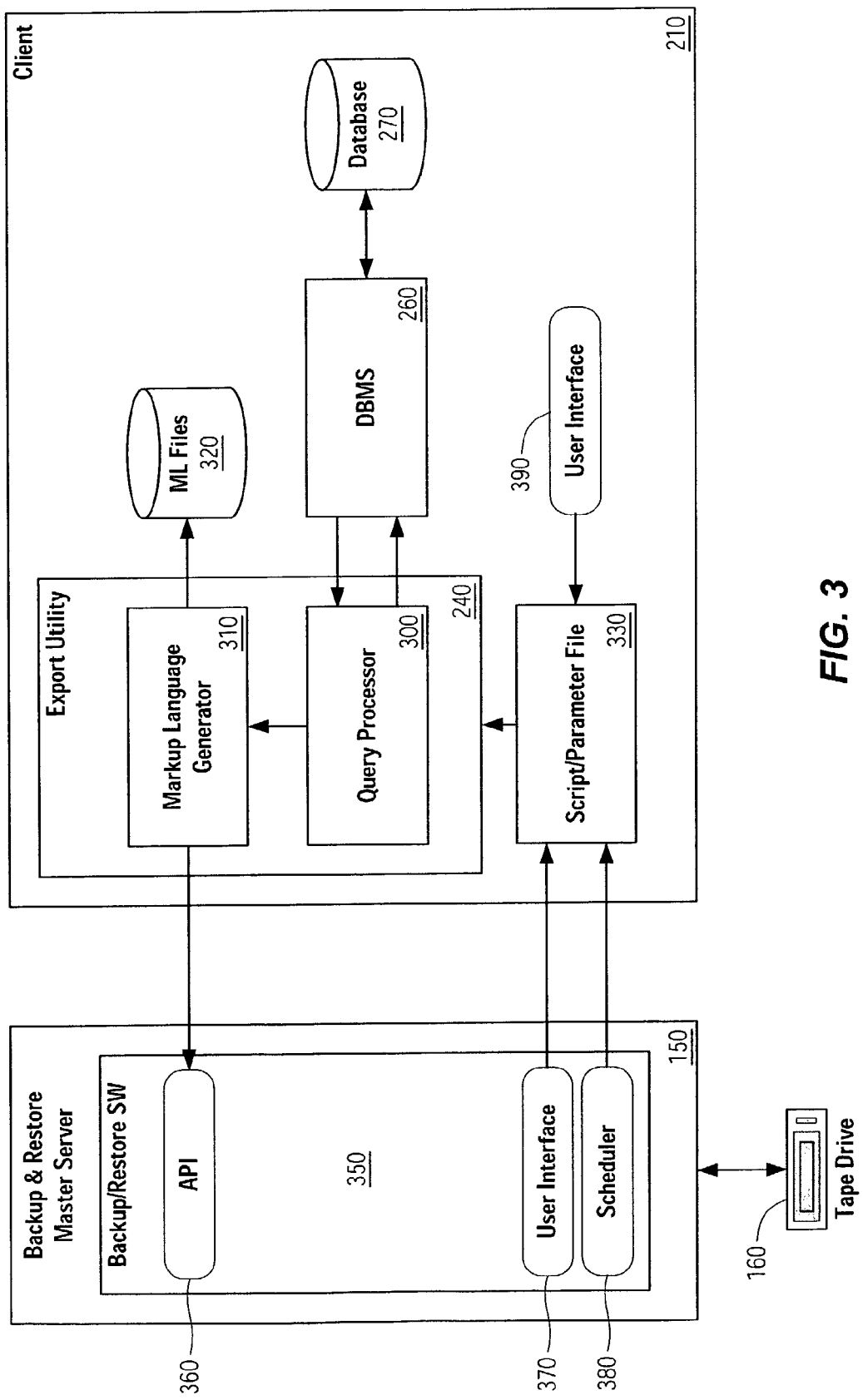
FIG. 3 illustrates in greater detail the operation of one aspect of the markup language agent in the data backup and recovery system of FIG. 2.

FIG. 3 illustrates in greater detail the operation of export utility 240 of markup language agent 230. For convenience, other aspects of markup language agent 230 and backup and restore agent 220 are not shown in FIG. 3. Export utility 240 is invoked by a user via a user interface 370, e.g., a command line interface or a graphical user interface. As shown, user interface 370 is part of backup and restore software 350 operating on backup and restore master server 150. Alternately, a user of client computer system 210 could invoke export utility 240 using user interface 390 operating from client 210. In yet another example, export utility 240 is invoked by an automated process scheduler 380. However the software is activated, operation of export utility 240 typically begins when it receives a script or parameter file 330 that includes (for the database example) a list of tables and optionally a where clause to restrict the data that is selected for export. Note that relational databases typically contain many rows of data, with each row constituting a separate record. Relational database queries can retrieve all or only a portion of the records contained in a table. The where clause qualifies the query command statement to limit the data retrieved to, for example, specific rows in the table. Script/parameter file 330 can be directly passed to export utility 240 or its location or filename can be passed so that the utility can read necessary information for the export operation. As shown in FIG. 3, script/parameter file 330 is stored on client computer system 210. The contents of the file and/or the file itself can be passed to client computer system 210 by backup and restore master server 150. Alternately, the necessary information can be passed directly to export utility 240 via either of user interface 370 or 390.

With a description of the data to be extracted as provided by script/parameter file 330, query processor 300 takes the necessary steps to have the appropriate application provide it with the desired data. Continuing with the database management system example, query processor 300 builds the appropriate database query (e.g., one or more structured query language (SQL) statements) to run against database 270. For example, query processor 300 will use the information from script/parameter file 330 to construct commands used by database management system 260 to extract the desired data. Query processor 300 may also perform additional functions such as validating a user's access to the data, validating the export request and reporting any error associated with the request. The query commands are passed to DBMS 260, processed by DBMS 260, and the extracted data returned to query processor 300.

Query processor 300 typically interfaces with database management system 260 (or any other application from which data is to be extracted) via an application programming interface (API) that is part of DBMS 260 or provided by for use with DBMS 260. In some cases, the API itself executes the commands prepared by query processor 300. Alternately, DBMS 260 can include features allowing it to interface directly with other programs. In addition to the target data to be extracted, query processor 300 may also receive metadata describing, for example, the organization of, the data types of, and/or constraints on the target data. Such metadata may have to be translated into a format appropriate for the markup language in use. For example, the format of a date data type as used by DBMS 260 might be different from the format used by the markup language. Consequently, query processor 300 can provide translation of this metadata in preparation for its use by markup language generator 310. Thus, the output of query processor 300 includes both metadata describing the table or tables of data extracted from database 270 and the table data itself.

Information is typically passed from query processor 300 to markup language generator 310 on a buffer by buffer basis. The size of the buffer can be set as one of the parameters initially passed to export utility 240. In the case of an XML implementation, markup language generator 310 builds, for each table of data received, an XML schema document and one or more XML instance documents. The XML schema document includes the aforementioned metadata, while the instance document includes the actual data. A table that contains LOB data (Large Objects) will typically result in more than one XML instance document. Each piece of LOB data will be stored in a separate XML instance document and the primary instance document for the table references each LOB document using a Uniform Resource Identifier (URI) reference. If a table does not contain LOB data, only one XML instance document is typically created. In addition, a master XML schema document can be built that contains "include" references to each of the individual XML schemas.

With the extracted data now translated into the desired markup language format, the data is passed to backup and restore software 350 operating on backup and restore master server 150. Once the data leaves markup language generator 310 it is treated by the backup and restore system just as any other data stream that is being backed up. Thus, the data might pass from markup language generator 310 to backup and restore agent 220 (shown in FIG. 2) before it is received by backup and restore software 350. Additionally, backup and restore software 350 can include its own application programming interface 360 that is specific to software 350 and facilitates processing of data to be archived. Alternately, backup and restore software 350 can interface directly with the software operating on client computer system 210 to receive the markup language data stream. Once received by backup and restore software 350, the markup language data stream is saved, e.g., to tape drive 160, in a desired manner as specified by backup and restore master server 150. Alternately, or in addition to saving via backup and restore master server 150, the markup language version of the extracted data can be saved to markup language files 320. Although illustrated as being saved to storage that is a part of client computer system 210, the markup language version of the extracted data can, in general, be saved to any part of the computing system 200 via, for example, network 110.

Export Utility 240 is typically implemented as a separate program and uses an appropriate DBMS interface to extract table definitions and table data from database 270. For example, if DBMS 260 is one of the database management systems provided by Oracle Corporation, export utility 240 might interface with DBMS 260 using the Oracle Call Interface (OCI) which provides a C language call interface to Oracle databases. In one embodiment of export utility 240, the following are examples of parameters used by export utility 240, and thus parameters that might be included in parameter file 330 or passed directly to export utility 240 via a command line user interface:

CONSISTENT=N: Specifies whether or not export utility 240 uses the SET TRANSACTION READ ONLY statement to ensure that the data from all tables is consistent to a single point in time and does not change during the execution of the export utility command. If the default of CONSISTENT=N is used, each table is exported as an independent transaction.

KEYWORD=no default: Optionally specifies a keyword phrase that backup and restore software (e.g., 220 and/or 350) associates with the image being created by the archive operation.

DIRECTORY=no default: Optionally specifies a directory for the output of export utility 240.

HELP=N: Displays a help message with descriptions of export utility 240 parameters.

LOG=no default: Optionally specifies a file name to receive informational and error messages.

NAME=no default: The name of the master XML schema file. The file names of the remaining files are automatically created using the table name exported.

NB_ORA_SERV=Default Master Server: Optionally specifies the name of the master server.

NB_ORA_CLIENT=Default Client: Optionally specifies the name of the backup and restore client computer system where the application from which data is extracted is located (e.g., DBMS 260).

NB_ORA_POLICY=Default Oracle Policy: Optionally specifies the name of a policy associated with the backup and restore client computer system specific to the application from which data is extracted.

NB_ORA_SCHED=Default Backup Policy Schedule: Optionally specifies the name of the backup policy schedule to use.

OWNER=no default: Lists the schema owners to export. For each owner, the tables, partitions, and views owned by that user account are exported.

QUERY=no default: This parameter allows for the selection of a subset of rows from a set of tables. The value of the query parameter is a string that contains a WHERE clause for a SQL select statement which will be applied to all tables, views, and table partitions listed in the TABLE parameter.

ROW_BUFFER=INTEGER (Default=1000): Specifies the size, in rows, of the buffer used to fetch rows, i.e., the maximum number of rows in an array fetched by export utility 240. Tables with LONG columns are fetched one row at a time.

TABLES—no default: Lists the table names, view names, and partition names to export. The USERID must have SELECT privilege on the tables and views. The syntax used is: schema.table:partition name or schema.view name.

USERID=no default: Specifies the username/password (and optional connect string) of the user initiating the export.

These parameters, their descriptions, and their default values are merely illustrative of the types of parameters that might be used by export utility 240 to perform data extraction and conversion into a markup language format. Other possible parameters, scripts, or commands will be well known to those having ordinary skill in the art.

A markup language export operation can be scheduled by invoking export utility 240 via a script or command that is part of a backup policy and implemented by scheduler 380 or some other portion of backup and restore software 350 and/or backup and restore agent 220. In this way, the user can schedule markup language archiving. Moreover, such scripts can also allow for additional pre and post processing of the data to be extracted. In the case of data in database 270, for example, SQL post processing can be used to delete database rows that have been archived by export utility 240. In other examples, SQL scripts are invoked either before or after an export or import. These scripts can be used to drop and recreate constraints and indexes before and after an import and to create tables before an import. A variety of other possible pre and post processing operations will be well known to those having ordinary skill in the art.

Figure 4:
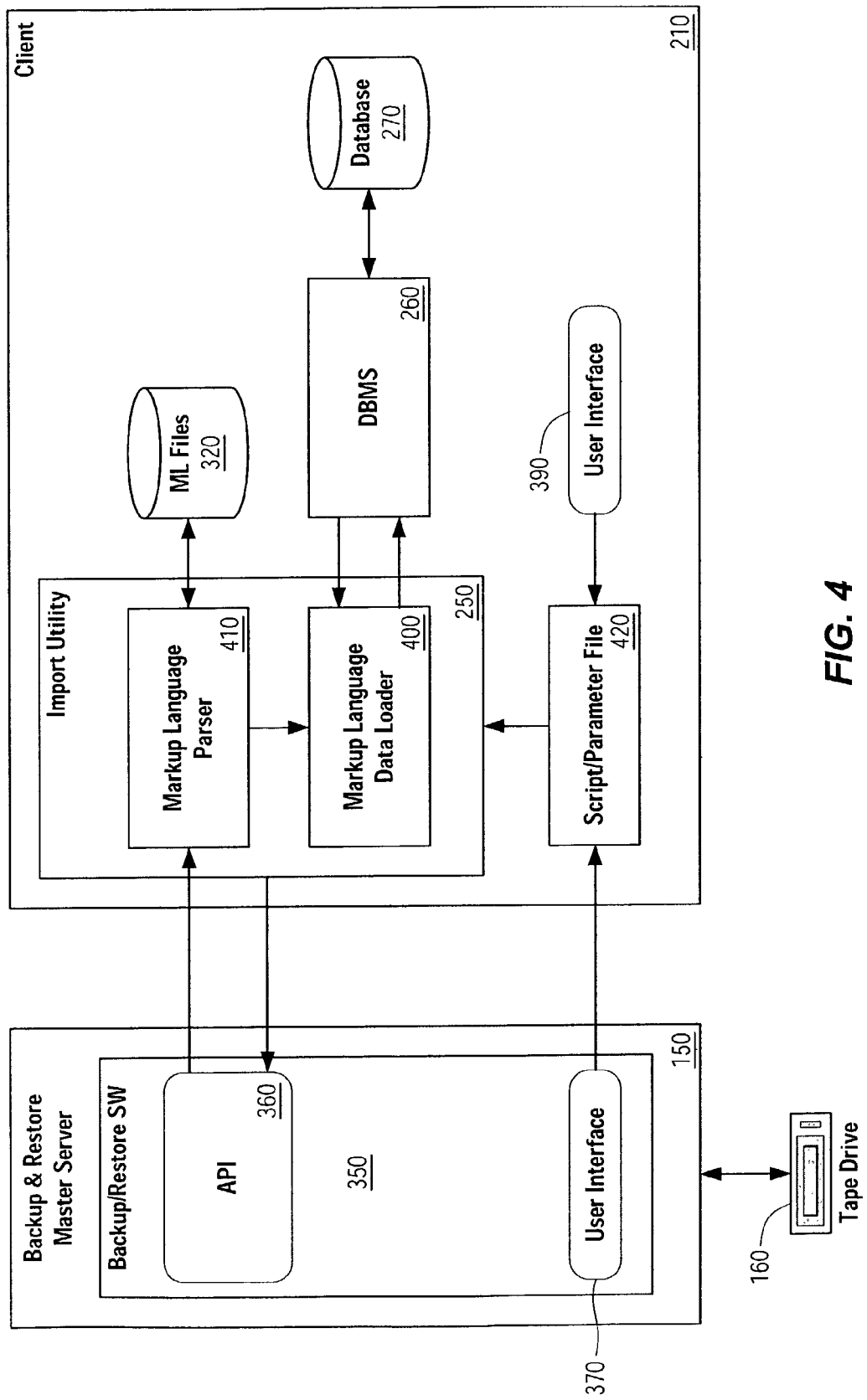
FIG. 4 illustrates in greater detail the operation of another aspect of the markup language agent in the data backup and recovery system of FIG. 2.

FIG. 4 illustrates in greater detail the operation of import utility 250 of markup language agent 230. For convenience, other aspects of markup language agent 230 and backup and restore agent 220 are not shown in FIG. 4. Import utility 250 is a program that reads the set of markup language metadata and data document files created by export utility 240 and either inserts the data into an application or the application's associated storage files or restores the data as a set of files to storage that is part of computing system 200. Import utility 250 is invoked by a user via a user interface 370, e.g., a command line interface or a graphical user interface. As shown, user interface 370 is part of backup and restore software 350 operating on backup and restore master server 150. Alternatively, a user of client computer system 210 can invoke import utility 250 using user interface 390 operating from client 210. However the software is activated, operation of import utility 250 typically begins when it receives a script or parameter file 420 that includes (for the database example) a list of tables to be loaded from archived markup language documents, or, an indication that the entire set of tables should be imported. In one embodiment, portions of tables can be loaded instead of complete tables.

The input parameters for archive identification sent to import utility 250 are passed to backup and restore software 350. In the example illustrated, the parameters are passed to software 350 via application programming interface 360. Backup and restore software 350 locates and reads, in the case where the markup language is XML, the set of XML schema and instance documents from the appropriate storage device, e.g., a tape in tape drive 160. The stream of XML data is passed to markup language parser 410. Markup language parser 410 organizes data and metadata extracted from the archive and transfers that information to markup language data loader 400 one buffer at a time. Alternately, import utility 250 can restore the files directly to a file system directory. In yet another example, the input parameters for archive identification sent to import utility 250 instruct the utility to load markup language files from a file system directory, e.g., markup language files 320.

Markup language data loader 400 inserts received data into database 270. To accomplish this task, markup language data loader 400 either interfaces directly with DBMS 260 or utilizes an application programming interface such as the aforementioned OCI. In one embodiment, import utility 250 assumes that the table to be inserted already exists logically within database 270. Thus, import utility 250 does not create any database objects. In another embodiment, import utility 250 can include functionality to create (or cause the creation of) database objects. Additional access control can also be used to determine, for example, whether or not a user is authorized to import a particular table.

An additional feature of import utility 250 is the ability to import only metadata. This information can be used, for example, to track or catalog which information is archived in a markup language format. The metadata can also be used to compare data formats and/or constraints with similar information in the database objects to which data may ultimately be imported. Any differences can be identified and the user alerted so that desired format/constraint changes can be made. Additionally, either import utility 250 or another piece of software (not shown) can include data mining functionality thereby allowing the markup language files to be searched, statistics to be compiled on the data, and particular pieces of data to be extracted.

In one embodiment, import utility 250 selects the archive to be restored based upon a combination of parameters including the name of the archive, date ranges that specify when the archive was created, the username that was used to create the archive, the database schema owners contained in the archive, specific database objects contained in the archive, and keywords associated with the archive. Once an archive has been identified, markup language parser 410 requests for restore only the table data that was specified in the parameter file. It then parses the archive data that is returned from the backup and restore software 350 a buffer at a time. Each archive is a backup image that includes multiple backup objects (typically a minimum of three backup objects per image) corresponding to a master schema, a table schema, and a table instance document. If a table contains LOB data, the LOB data will be included in the table instance document backup object rather than being stored as separate backup objects in the backup image. For each table, markup language parser 410 first determines the data types of all of the columns being loaded and based on the data types, sizes, etc., it parses the table instance document that can contain embedded LOB data. If the archive is being restored to a system directory, the parser creates multiple XML instance documents depending on the presence of LOB data.

Markup language data loader 400 inserts the parsed data into database 270 and its behavior is controlled by the user via the parameter file. The user can control whether the data should be inserted into the table if data already exists in the table. In one example, the default behavior is not to insert any data if the table contains any rows. The user also has control over how many rows are inserted at a time and how often DBMS 260 commits the set of row inserts that have occurred so far. If the table already contains data in the database 270, these parameters can be used to control inserting a subset of the rows from the archive (for example, if there are unique constraint violations on some of the data, the user can force all rows that don't have a constraint violation to be inserted by setting COMMIT=y and ROW_BUFFER=1).

In one embodiment of import utility 250, the following are examples of parameters used by import utility 250, and thus parameters that might be included in parameter file 420 or passed directly to import utility 250 via a command line user interface:

ARCHIVE_DATE_FROM=no default: Optionally specifies a start date for the archive to be imported. Used with ARCHIVE_DATE_TO to specify a range. If not used, the most recent archive is imported. If the range used results in more than one archive, the most recent from the range is used.

ARCHIVE_DATE_TO=no default: Optionally specifies an end date for the archive to be imported. Used with ARCHIVE_DATE_START to specify a range. If not used, the most recent archive is imported. If the range used results in more than one archive, the most recent from the range is used.

BFILE_DIRECTORY=no default: Specifies a directory for the output of any BFILE columns (i.e., columns that access data in external binary files) being imported.

COMMIT=N: Specifies whether import utility 250 should commit after each array insert. By default, import utility 250 commits only after loading each table, and performs a rollback when an error occurs, before continuing with the next object.

DIRECTORY=no default: Optionally specifies a directory for the input of import utility 250.

FROMUSER=no default: Optionally specifies a comma-separated list of users to import from a import utility 250 archive containing multiple user's tables. If not specified, all of the tables will be imported.

HELP=N: Displays a help message with descriptions of the import utility 250 parameters.

IGNORE_ROWS=N: Specifies whether or not rows should be inserted into a table that is not empty. The default is that the table already exists and that it is empty. If it is not empty, IGNORE_ROWS=N causes an error to be reported, and the table is skipped with no rows inserted IGNORE_ROWS=Y causes rows to be inserted with errors reported, i.e., constraint violations, in the LOG file.

KEYWORD=no default: Optionally specifies a keyword phrase for backup and restore software (e.g., 220 and/or 350) to use when searching for archives from which to restore files.

LIST=N: LIST=Y queries a backup and restore software catalog (not shown) and lists the archives available. A combination of NAME, TABLES, FROMUSER, KEY- WORD, ARCHIVE_DATE_FROM, and ARCHIVE_DATE_are used to limit the search. Does not actually import the data if LIST=Y.

LOG=no default: Optionally specifies a file name to receive informational and error messages. If this parameter is specified, messages are logged in the log file and not displayed to the terminal display.

NAME=no default: The name of the master XML schema file. This parameter is required if LIST=N.

NB_ORA_SERV=Default Master Server: Optionally specifies the name of the master server.

NB_ORA_CLIENT=Default Client: Optionally specifies the name of the backup and restore client computer system where the application containing the data that was originally archived is located (e.g., DBMS 260). This parameter is used to restore an archive to a client other than the one that originally performed the archive.

RESTORE_SCHEMA_ONLY=N: Used with RESTORE_TO_DIRECTORY to restore the XML schema files only to a directory.

RESTORE_TO_DIRECTORY=no default: Optionally specifies a directory where the XML schema and document files will be restored. The data will not be inserted into the data files associated with an application, e.g., database 270.

ROW_BUFFER=INTEGER (Default=1000): Specifies the size, in rows, of the buffer used to insert rows. Tables with LONG columns are inserted one row at a time.

TABLES=no default: Optionally specifies a list of table, view, and partition names to import. If not used, all objects in the archive will be imported.

TOUSER=no default: Optionally specifies a comma-separated list of users to import to that may be used with the FROMUSER parameter to change the table owners. The TOUSER database accounts must already exist, and the USERID must have INSERT privilege on the tables that must also exist.

USERID=no default: Specifies the username/password (and optional connect string) of the user initiating the import.

In general, both export utility 240 and import utility 250 are designed to operate with designated data types associated with the application producing data to be archived. For example, where DBMS 260 generates data for database 270 that conforms with data types defined by DBMS 260, export utility 240 and import utility 250 include functionality to support such data types and perform markup language import/export while maintaining the data types. Additionally, some applications may allow user specified (as opposed to vendor specified) data types. Such data types can also be supported by export utility 240 and import utility 250 given sufficient information about the user-defined data types. In a similar manner, data constraints specifying valid data values are supported by export utility 240 and import utility 250. For example, a NOT NULL column constraint from a database can be represented in the XML Schema generated by export utility 240 using the XML entity attribute "nillable." If a database column is NOT NULL, nillable would be set to "false," otherwise it would be set to "true." In a similar fashion, other constraints can be supported.

In many implementations, it is desirable that data archived using the tools described above be readily accessible by a variety of different software tools. To that end, it will typically be preferable to use standards based markup languages (e.g., XML 1.0 as approved by the World Wide Web Consortium (W3C)). Such support may also require adherence to other standards. For example, it may be desirable or necessary to encode the exported documents using a Unicode character set, e.g., UTF-8 and UTF-16 as described in the Unicode Standard as promulgated by the Unicode Consortium.

Figure 5:
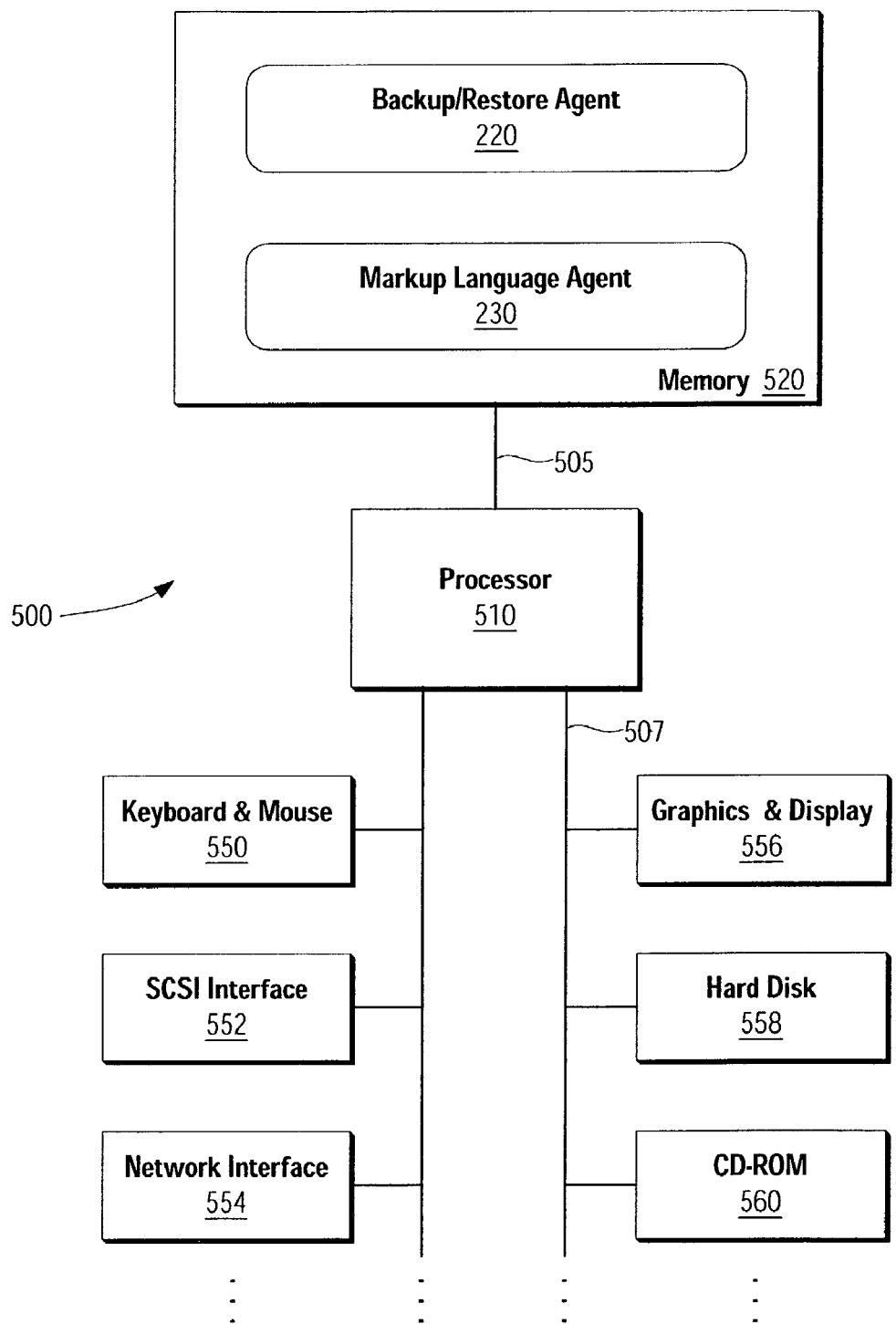
FIG. 5 is a simplified block diagram of a computer system for implementing the techniques of the present invention.

FIG. 5 illustrates a block diagram of a computer system 500 for implementing the techniques of the present invention. For example, computer system 500 can be an embodiment of one of the previously described servers, clients or hosts. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., markup and restore agent 220 and markup language agent 230. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 220 and 230 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown. An example of such an additional computer system device is a fibre channel interface.

Although the systems, methods, apparatus and software of the present invention have been described using database management system and database examples, it will be understood by those having ordinary skill in the art that extension can be made to virtually any data producing/process application and the resulting data. Thus, the present application should not be thought of as being limited to use in the context of databases and database management systems.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A system comprising:
a query processor for constructing a command to extract data of some but not all rows in a database table in accordance with information from a parameter file, wherein the parameter file comprises a list of tables entered via a command line user interface to restrict data that is selected for export;
a data base management system for executing the command;

in response to executing the command, receiving the data of some but not all rows in the table;

a backup and restore module configured to generate a first data stream to be backed up and transmit the first data stream to a backup and restore server for further direction to a storage device;

a markup language module configured to receive the data of some but not all rows in the table, translate the data into a markup language version and pass the markup language version to the backup and restore module.

2. The system of claim 1 wherein the markup language module uses extensible markup language (XML).

3. A computer-implemented method comprising:

receiving a backup request;

constructing a command to extract data of some but not all rows in a database table using information from a parameter file, wherein the parameter file comprises a list of tables entered via a command line user interface to restrict data that is selected for export;

executing the command;

in response to executing the command, receiving the data of some but not all rows in the table;

translating the data into a markup language version; and transmitting the markup language version to at least one of a backup and restore module or an archive file.

4. The method of claim 3 further comprising:

transmitting the markup language version from the backup and restore module to a backup and restore server.

5. The method of claim 3 wherein:

the parameter file comprises at least one parameter for identifying the some but not all rows of the table.

6. The method of claim 3 wherein the markup language is extensible markup language (XML).

7. The method of claim 3 wherein the application program is a database management system.

8. A computer readable storage medium comprising:

program instructions executable on a processor, encoded on the computer readable storage medium, and operable to implement each of:

receiving a backup request constructing a command to extract data of some but not all rows in a database table using information from a parameter file, wherein the parameter file comprises a list of tables entered via a command line user interface to restrict data that is selected for export;

executing the command;

in response to executing the command, receiving the data of some but not all rows in the table;

translating the data into a markup language version; and transmitting the markup language version to at least one of a backup and restore module or an archive file.

* * * * *